United States Patent
Smith

[15] 3,685,198

[45] Aug. 22, 1972

[54] INSECT ATTRACTING AND DESTROYING DEVICE

[72] Inventor: Charles N. Smith, Venice, Fla.

[73] Assignee: Insect-J-Var Corporation, Venice, Fla.

[22] Filed: Sept. 11, 1970

[21] Appl. No.: 71,614

[52] U.S. Cl. ................................................43/112
[51] Int. Cl. ..............................................A01m 1/22
[58] Field of Search...............................43/112, 113

[56] References Cited

UNITED STATES PATENTS

| 779,672 | 1/1905 | Smith | 43/113 |
| 1,163,823 | 12/1915 | Irvine | 43/112 |
| 2,513,544 | 7/1950 | Yarbrough | 43/113 |
| 3,540,145 | 11/1970 | McEwen | 43/113 |

FOREIGN PATENTS OR APPLICATIONS

| 733,262 | 7/1932 | France | 43/112 |
| 656,202 | 1/1963 | Canada | 43/112 |
| 1,490,504 | 6/1967 | France | 43/112 |
| 729,869 | 3/1966 | Canada | 43/112 |
| 1,515,795 | 1/1968 | France | 43/112 |

*Primary Examiner*—Warner H. Camp
*Attorney*—Hume, Clement, Hume and Lee

[57] ABSTRACT

A device for attracting and destroying flying insects which includes an electrified grid, a light source, a heating chamber, flue, and heat trapping chamber. Insects are attracted by the light, electrocuted upon contacting the grid, and collected adjacent the heating chamber. Their bodies are heated by the heat source, causing an odor to rise past the electrified grid and to disseminate from the device. The odor assists in attracting other insects to the electrified grid. A cowling design is also provided to trap a portion of the heat and odors generated. A perpetual and accelerated attraction of other insects to the electrified grid is created.

5 Claims, 3 Drawing Figures

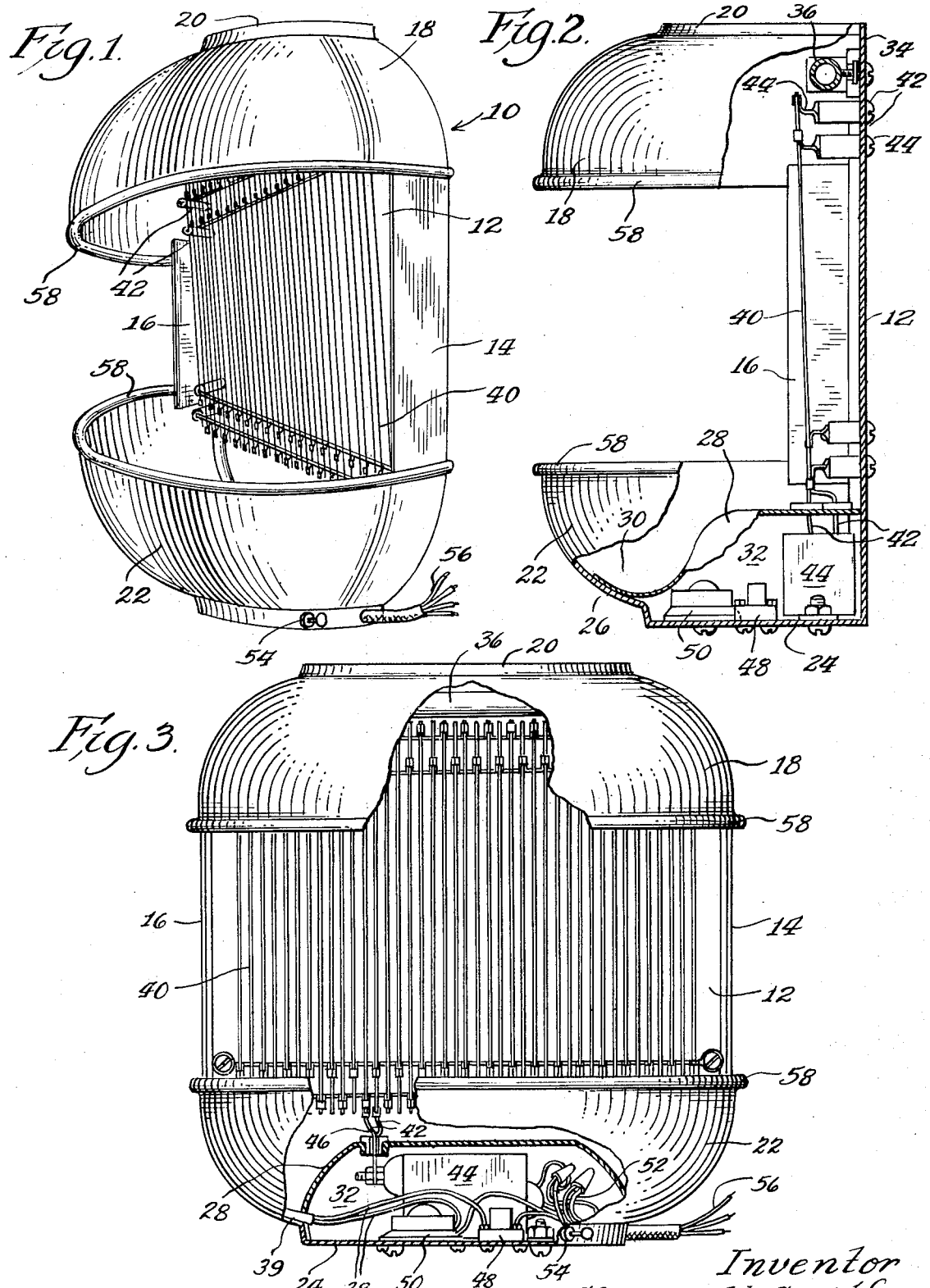

3,685,198

INSECT ATTRACTING AND DESTROYING DEVICE

BACKGROUND OF THE INVENTION

1. Field of the Invention

This invention relates to a novel insect attracting and destroying device, and, more particularly, to a device which uses the odor caused by heating dead insects to attract other insects to an electrified grid. This odor is in addition to the attraction caused by a conventional light source, and a heat sump is provided which further aids in attracting those insects which are responsive to heat.

2. Description of the Prior Art

Insect attracting and destroying devices are known in the prior art which utilize an electrified grid to electrocute insects coming into contact therewith. It is conventional to use a light source in adjacent juxtaposition to the grid as a means of attracting flying insects to the grid, such as disclosed in the U.S. Pat. to Brown, No. 2,465,574, issued Mar. 29, 1949. Devices are also available wherein a light source is used to heat a separate odoriferous medium, which generates an odor effective in attracting insects to their destruction against an electrical apparatus. See, for example, Wright U.S. Pat. No. 2,608,022, issued Aug. 26, 1952. Other insect destruction devices merely use the heat from a light source such as an incandescent bulb to destroy an insect who comes into direct contact with the bulb after being attracted thereto by the light.

SUMMARY OF THE INVENTION

The present invention relates to a device for attracting and killing flying insects. To this end, the device relies upon the odor caused by heating dead insects to attract other insects which are appropriately destroyed. As the insects are killed, they are collected and heated. In another aspect of the invention, heat is partially trapped and is used to additionally attract insects to the device.

It will be apparent from the foregoing that a primary object of the present invention is to provide an insect destroying device including means for heating dead insects to create an odor to lure additional insects to their destruction.

It is a further object of this invention to provide a device which uses the odor of dead insects to attract other insects to their destruction whereby an electrical charge is caused to be conducted through the bodies of the insects.

An additional object of the present invention is to provide an insect attracting and destroying device which produces a light source in addition to creating an odor by heating dead insects, which light source and odor combine to offer an attraction to other insects.

Another object of the present invention is to provide a source of trapped heat which acts in combination with the light source and odor of dead insects to attract other flying insects.

Still another object of the present invention is to provide readily removable means for collecting dead insects adjacent a source of heat, which collecting means are easily cleaned.

It will be apparent from the foregoing, that an insect attracting and destroying device has been provided which uses a novel combination of phenomenon which are sensually attractive to insects, i.e.: light, heat, odor. Other objects of the invention will become apparent from the specification which follows and from the drawings to which reference is now made.

BRIEF DESCRIPTION OF THE DRAWINGS

FIG. 1 is a side perspective view of the insect attracting and destroying device of the present invention;

FIG. 2 is a side partial cutaway view of the device of the present invention, illustrating the attachment of the light source, electrified grid, and heat producing elements.

FIG. 3 is a front, partial cutaway view of the present invention disclosing the electrical activating apparatus and its connection to the electrified grid.

DESCRIPTION OF THE PREFERRED EMBODIMENT

The disclosed embodiment of the present invention comprises a housing 10 which consists of a rear frame 12 and vertical side panels 14 and 16. Attached to the upper part of frame 12 is a domed cowling 18 in the form of an inverted semi-bowl-like structure with a flat upper portion 20. The front of cowling 18 extends forwardly and outwardly from frame 12 and forms an upper hooded portion of housing 10.

Attached to the opposite end of frame 12 from cowling 18 is a collection chamber 22 in the form of a semi-bowl-like structure with a flat bottom member 24. Collection chamber 22 forms a receptacle for retaining insects which are electrocuted by the device of the present invention, and provides a housing for electrifying apparatus essential to the operation of the invention, as will be explained. Suitably disposed in collection chamber 22 is a collecting tray 26 which comprises a raised hemispherical portion 28 (FIG. 2) located adjacent frame 12, and a semicircular, concave receptacle portion 30 adjacent the rim of hemispherical portion 28. Collecting tray 26 may be removed from chamber 22 by lifting upwardly and outwardly, and is preferably made of a suitable heat-resistant material which is easily cleaned. Heat chamber 32 is bounded by hemispherical portion 28, frame 12, and bottom member 24, and serves a purpose herein to be described.

Affixed to frame 12 beneath cowling 18 is a fixture 34 for supporting a light source 36. This light source preferably is a florescent tube radiating light near the ultraviolet end of the spectrum, and extends laterally across the frontal length of frame 12. Due to the position of light source 36 beneath cowling 18, the present invention does not produce a disturbing, directly-visible source of light. Wires 38 (FIG. 3) extend from fixture 34 to a source of electric power located in collection chamber 22, as will be described. An insulating tube 39 surrounds wires 38 to protect the wires from the heat generated in heat chamber 32.

An electrical grid system 40 of a grill construction is suitably attached to frame 12 by means of insulation elements 42 and screws 44. Insulation elements 42 are composed of ceramic, plastic, or other non-conducting material. The grid 40 comprises vertically disposed parallel rods constituting electrical conductors. Alternate rods are electrically charged with the opposite polarity, and the rods are so spaced that small insects, such as flies and mosquitoes, will bridge this space and are destroyed by passage of an electrical charge through their bodies. The rods are sufficiently spaced apart to avoid arcing except through an insect.

The electrified grid 40 is connected by jump wires 42 to a high voltage, low current transformer 44 which radiates a substantial amount of heat when activated. Transformer 44 is secured to flat bottom member 24 of collection chamber 22, and is located in heat chamber 32. A slot 46 is provided in hemispherical portion 28 of collecting tray 26 through which jump wires 42 pass. Also disposed in heat chamber 32 are a starter mechanism 48 to trigger the illumination of light source 36, and a ballast element 50 to feed light source 36. Starter 48 and ballast 50 are electrically connected to fixture 34 and light source 36 by means of wires 38. Wires 52 forming the electrical connections between transformer 44, starter 48 and ballast 50 are disposed in heat chamber 32, and are connected to a switch 54 located in the base of housing 10 to control a source of electrical energy transmitted through wires 56 from a suitable connection to a main. Starter 48 and ballast 50 have been observed to radiate heat when electrically activated, and aid transformer 44 in supplying a source of heat in chamber 32 for purposes to be explained.

The relative location of frame 12 and vertical side panels 14, 16 provides a means to control air currents through the housing 10, as well as holding the remaining elements of the device in a balanced relation. The cowling 18 forms a hood over heat chamber 32 and grid 40 which acts as a heat and odor trapping shelter, as will be explained. Edging material 58 may be provided along the rim of cowling member 18, collection chamber 22 and vertical side panels 14, 16 to further control air currents and cover the sharp edges of the sheet material forming housing 10.

OPERATION

The purpose of the disclosed invention is to attract and destroy flying insects in an indoor environment. To this end, the invention may sit on its base 24 or hang on a wall by a key slot or other suitable means provided in rear frame 12 near or above ground level in or near the path of pesty flying insects. Electrical energy is brought to the device by attaching wires 56 to an ordinary male electrical plug (not shown) and connecting the plug to an available source of electrical power. The disclosed embodiment is of such proportions and design to operate off of ordinary house current. However, it may be appreciated that for extraordinary installations, the design and structure of the disclosed device may be changed to suit greater demands and use higher sources of electrical energy without departing from the scope of the invention.

With the wires 56 properly connected to a source of electrical energy, switch 54 is moved to its "on" position, thereby allowing electrical energy to pass through wires 52 to transformer 44, starter 48, and ballast 50. The latter two elements cause an electric current to pass through wire 38 to fixture 34, thus illuminating florescent light source 36 beneath cowling 18. The activation of transformer 44 causes grid 40 to become electrified, with alternate rods being charged with opposite polarities, as described above. Transformer 44, starter 48, and ballast 50 each radiate a quantum of heat when activated, and this heat is accumulated in chamber 32 beneath hemispherical portion 28 of collecting tray 26. Thus, heat chamber 32 acts as a sump for heat created by the electrical elements disposed in the chamber.

Flying insects are initially lured towards the device by their attraction to light source 36. It is common knowledge that most insects are attracted towards a source of light. Upon approaching the light source, the insects contact grid 40, whose component rods are so spaced that most small flying insects must contact two adjacent, oppositely charged rods while passing through the grid. In so doing, the insects complete a circuit and an electrical charge passes through their bodies and destroys them.

The dead insects fall from the grid 40 and collect in the concave receptacle portion 30 of collecting tray 26, or they repose directly on top of hemispherical portion 28 of the collecting tray. In either case, the dead insects are collected adjacent or near enough to heat chamber 32 such that the heat generated by transformer 44, starter 48, and ballast 50 is conducted directly to the dead insects.

The heat causes an odor to emanate from the insects, and this odor, along with the heat is directed upward through grid 40. Vertical side panels 14 and 16, as well as frame 12 function as a chimney and direct the heat and odors upward from collecting tray 26 behind grid 40. The side panels and frame also provide a means to prevent the light and odor emanating from housing 10 from scattering over too broad an area. A major portion of the heat and odors are trapped beneath cowling 18, which also acts as a light shade and shelter area. Due to the open construction of housing 10, some of the odors created by the heat passing over the bodies of the dead insects drifts outwardly from the housing 10 and cowling 18 and is disseminated by the currents of air passing through housing 10.

The odor from the dead insects is dissipated over the area adjacent the location of housing 10, and attracts other flying insects toward the grid 40, and hence to their destruction. The insects are also attracted to the grid by the near ultraviolet light emanating from source 36. It has also been observed that most insects seek the shelter which is seemingly provided by the heat and odor trapped beneath cowling 18. Also, visual attraction of insects is created by the dead insects collected in tray 26. Insects are rather gregarious, and tend to congregate around each other. As the insects are attracted to the grid 40, they are electrocuted as a charge passes through their bodies, and they fall onto collection tray 26, where they are heated and give off an odor as did the insects previously reposing in the collecting tray.

It is apparent that after a duration of time, collecting tray 26 may have to be cleaned due to an overabundance of dead insects. This may be accomplished by manually lifting collecting tray 26 upward and outward from its position in collection chamber 22. Jump wires 42 cause no obstruction as they pass through slot 46 provided in the collection tray for facilitating easy removal of the tray and the insects deposited thereon. After cleaning, tray 26 may be replaced by merely reinserting it in collection chamber 22.

It will be appreciated that a unique insect attracting and destroying device has been disclosed which is attractive, efficient, easy to clean, and does not provide a disturbing directly-visible source of light. It has been observed that most insects, especially flies, are influenced by one or more of a number of phenomenon, such as heat, odors, light, protection from air currents and their own gregarious nature. The present invention incorporates one or more of these five attractive elements in a device that is relatively simple to install, operate and manufacture.

The foregoing embodiment is exemplary of the invention and may be used as a model for constructing the invention, however, many variations of the invention may be made without departing from the spirit and scope of the invention as defined in the following claims.

I claim:

1. An insect attracting and destroying device comprising:
   an electrical grid supported by a frame for electrocuting insects coming into contact with said grid;
   heat chamber means supported by said frame beneath said grid;
   electrical activating apparatus disposed in said heat chamber for electrifying said grid and which generates heat when activated;
   a source of light supported by said frame above said grid and electrically connected to said electrical activating apparatus;
   cowling means including a domed top supported by said frame and disposed vertically above said grid;
   said light source disposed beneath said cowling;
   insect collection means disposed beneath said grid and immediately adjacent said heat chamber for collecting insects which are destroyed by contacting said grid, whereby said heat generated by said electrical activating apparatus rises past dead insects disposed on said insect collection means, thereby causing an odor to emanate from said insects which provides an attraction for other insects; and
   side panel means associated with said frame means to carry heat and odors upward from said heat chamber past said grid to said cowling whereby heat and odors generated by said heat passing over said dead insects rise and are trapped beneath said cowling and ultimately disseminated by air currents only over a controlled area adjacent said device.

2. A device for attracting and destroying insects comprising:
   grid means for electrocuting insects coming into close proximity thereto;
   a collection chamber disposed below said grid means for retaining insects electrocuted by said grid means, said collection chamber having a heat chamber disposed therein;
   means for heating said heat chamber and generating heat in said collection chamber to heat insects retained in said collection chamber, the heating of said electrocuted insects generating odors for attracting insects; and
   domed cowling means disposed above said grid means for forming a hood over said collection chamber, said domed cowling means co-operating with said collection chamber for controlling the dispersion of the heat and odors rising from said collection chamber.

3. The device of claim 2 wherein said means for heating comprises electrical components for activating said grid means.

4. The device of claim 2 further including side panel means for further controlling the dispersion of the heat and odors rising from said collection chamber.

5. The device of claim 2 further including a source of ultra-violet radiation disposed within said domed cowling means, said ultraviolet radiation co-operating with said odors to attract insects to said grid means.

* * * * *